Patented Dec. 17, 1929

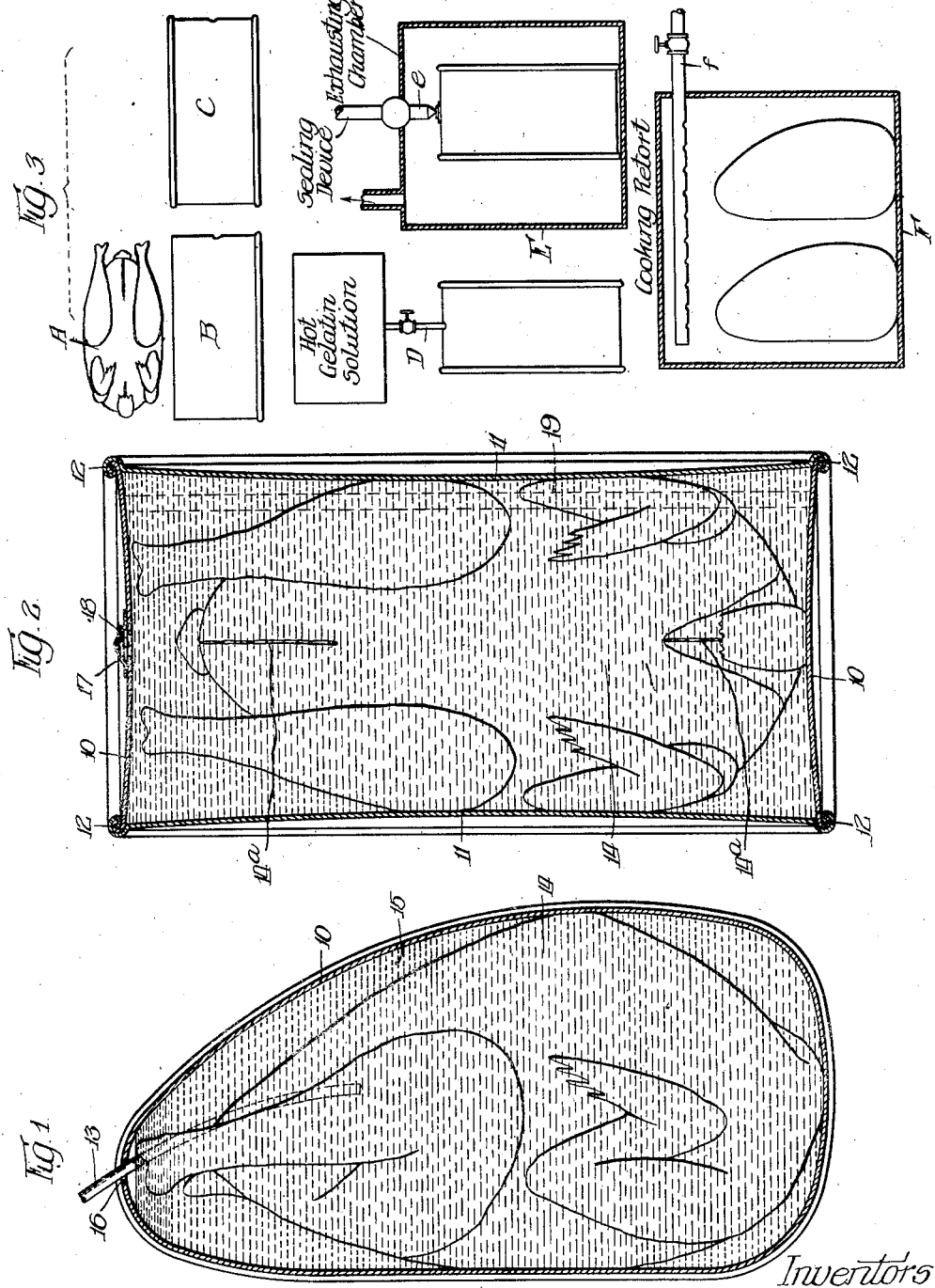

1,740,176

UNITED STATES PATENT OFFICE

JAY C. HORMEL, OF LANSING TOWNSHIP, MOWER COUNTY, AND HORACE H. COREY AND EDWIN J. CASHMAN, OF AUSTIN, MINNESOTA, ASSIGNORS TO GEO. A. HORMEL & COMPANY, OF AUSTIN, MINNESOTA, A CORPORATION OF DELAWARE

POULTRY PACKAGE AND METHOD OF MAKING SAME

Application filed April 8, 1929. Serial No. 353,290.

This invention relates to food packaging and preserving, and pertains particularly to the packing and preserving of poultry in merchantable packages. A general object of the invention is the provision of an improved merchantable package of poultry of which the contents is suitably cooked, seasoned and preserved and maintained in a desirable integrity of form so that upon removal from the container it is in condition for immediate carving and serving, or for subsequent finishing cooking as browning or frying, or for the preparation of other hot dishes such as pot pies or stews.

Another general object is the provision of a method for the making of such package whereby proper preserving and uniformity of seasoning and cooking of the contents are obtained and the fowl is maintained in proper structural form for carving and serving.

A specific object is the provision of an improved merchantable package of poultry, and a method of making same, whereby whole fowls, suitably dressed, may be properly and uniformly seasoned and cooked and preserved, and maintained in the form in which whole fowls customarily are prepared for carving, so that when the fowl is removed from the container it may be served, either with or without a preliminary oven browning, and have the appearance and savors of a freshly dressed and cooked fowl.

Other objects and purposes of the invention will be pointed out or indicated hereinafter or will be apparent upon an understanding of the invention or its employment in use.

For the purpose of aiding in the disclosure of the invention we show in the accompanying drawing forming a part of this specification certain diagrammatic illustrations of the package and a diagram illustrating steps in the process or method of its preparation, such drawing showing, in Fig. 1, a diagram in the nature of a side sectional elevation of a partly completed package, in Fig. 2 a diagram in the nature of a longitudinal section taken transversely of a completed package, and in Fig. 3 a diagram illustrating steps in the method of making the package.

Described generally, the method comprises first a proper cleaning and dressing of the fowl, both externally and in the internal cavities, with a complete removal of the viscera. The edible viscera, such as the heart and gizzard, after being suitably washed and cleaned, may then be replaced in the body cavity, when a whole fowl is packed, the slits of the body cavity, however, being left open. After being thus suitably dressed and cleaned the fowl is placed in a specially formed container adapted to receive the fowl closely and accommodate it in the natural or customary form in which it is usually served for carving. This container is preferably a metallic receptacle made of suitable thin sheet metal which is sufficiently flexible to bend under the difference of air pressure induced by the exhaustion of air from the interior of the receptacle incident to the sealing. The size and form of the container are such that it will hold the fowl against any substantial extent of movement within it. The container is then properly closed, all joints being hermetically sealed, but a small injecting aperture left at one end, which will be at the top of the package when it is stood upright. Through this injecting aperture all voids and unoccupied spaces within the container, both about the carcass of the fowl and its various members and within the body cavity are filled with a hot jellifying solution such as a solution of edible animal or vegetable gelatin, which solution also contains the desired seasoning preferably having a preservative quality. We may use, for example, a hot solution of salt and edible animal gelatin in water, comprising approximately 1 lb. gelatin (dry weight) to 25 lbs. water and ordinary seasoning salt in proportion of about 1 lb. to 16 lbs. of the water-gelatin solution. The container is filled with this solution to a point where it leaves only a small vacant space adjacent the injecting aperture, the size of which space should be approximately such as to permit its being filled by the solution displaced when the walls of the receptacle are partly collapsed consequent upon the air exhausting operation. The injecting aperture is then closed by a cap which is hermetically soldered in place, said cap being provided with a small exhausting vent. While the solution is still in its liquid condition the package is subjected to exhaustion of air from within the receptacle and the vent is thereupon hermetically sealed. Consequent upon the exhaustion of air from the container some of its wall portions are forced inwardly and pressed in close contact with portions of the fowl carcass, which portions previously may have been wetted with the gelatin solution, so that the carcass is held definitely in place in the container. The package is then subjected to heat processing in a retort in which a suitable pressure may be applied externally to the package, the degree of temperature and the extent of cooking being such as to adequately but not excessively cook the contents and sterilize them to the extent adequate to prevent bacterial decomposition of the organic matter in the presence of the salt solution in the sealed container. In this cooking, the seasoned gellifying solution operates to effect a uniform distribution and application of heat to all portions of the carcass and at the same time to apply to it the seasoning uniformly, the salt being absorbed by the fowl to an extent such that the proportion of salt in the solution is reduced to in the neighborhood of 3%. The solution is effective also to prevent the excessive extraction of juices from the meat during and subsequent to the cooking, and such juices as are extracted are retained in the solution, so that no flavoring values are lost. The preserving quality of the container aids in preventing bacterial decomposition of it and in the fowl submerged in it. At the termination of the cooking the package is cooled and chilled, and thereby the gellifying solution is set in a condition wherein it forms an envelopment for the carcass and its various members, which is effective to support the parts and flesh in a natural form and prevent extraction of juices and soluble elements from the meat. The clasping of the carcass by the container holds it against any substantial extent of movement, such as might break down the jelly or cause it to separate from the surface of the carcass.

Referring now to the drawing for an illustration of one particular example of the package and process, it will be understood that the reference numeral 10 designates a body wall and reference numerals 11 designate side walls of a container, said walls being designed to be hermetically joined by clincher seams 12. While the walls 10 and 11 are flexible, the beaded seams 12 form in effect comparatively rigid stiffening members which hold the container in a shape or form conforming generally to that of a dressed carcass of a fowl, the ends of the container being substantially narrower than the middle portion, as illustrated. The reference numeral 14 designates a suitably dressed and cleaned carcass of a fowl which is enclosed in the container, portions thereof being clasped or compressed between some of the container walls, and the carcass being in the form in which fowls customarily are prepared for roasting and carving, with the eviscerating openings 14a entering the internal body cavity. The reference numeral 15 designates a filling of salted gellifying solution which envelopes the carcass of the fowl and fills its internal cavities. As shown in Fig. 1, one of the walls of the container is provided with an injecting aperture 16 through which this gellifying solution is introduced, in a sterilized, heated and liquid form and condition, in an amount such as to substantially fill all voids within the container. Fig. 1 illustrates an advantageous manner of injecting the gellifying solution by means of a curved tube 13, which is inserted through the aperture 16 and into the body cavity of the fowl through a slit 14a. The hot solution, being injected through this tube under a proper pressure, will displace the air from the cavity, completely fill the latter, and fill the container to the desired height, whereupon the tube is withdrawn. Fig. 1 illustrates the condition of the package after a suitable quantity of the hot gelatin solution has been introduced. Fig. 2 illustrates a condition of the package after the injecting aperture has been closed by a cap 17 hermetically soldered to the container wall, and the air has been exhausted through a vent aperture 18 in said cap, and said aperture then closed by a drop of solder. It will be observed that under the external air pressure, wall portions of the container have been pressed inwardly in contact with the carcass, thus holding it definitely in position in the container and holding the gelatin solution closely in contact with the fowl. Fig. 3 illustrates successive steps in the preparation of the package. As illustrated at A, a suitably cleaned and dressed carcass of a fowl is provided and a suitably formed container B is provided, one of the covers or side wall portions 11 not yet having been placed thereon, and the fowl is placed in the container. At C the cover or side wall portion is secured in place by a hermetically sealed clincher seam, leaving an injecting aperture at one end unclosed. At D a quantity of hot gellifying solution is introduced through the injecting aperture into the container, sufficient to almost completely fill same, including cavities of the fowl, the injecting aperture being at the top of the package. Thereafter the injecting aperture is covered with a cap which is soldered in place, leaving a small exhausting vent, and at E the package is placed in an exhausting device, the air exhausted from within it through the exhausting vent, and the exhausting vent closed by a sealing device e. Thereafter the package is placed in a cooking retort as at F, where it is subjected to a cooking heat for a period sufficient to cook and sterilize the contents. At the end of said cooking, while the package is maintained under external pressure, it is cooled and chilled by water introduced as by a pipe f, whereby the wall portions of the container are subjected to pressure tending to flex them inwardly until the internal pressures are reduced so that the walls will hold that form and insure the gellifying solution setting in close contact with the fowl. On removal from the cooking and cooling retort the packages may be further chilled to set the gellifying solution more firmly, and are then ready for packing in cases for sale.

When the package reaches the consumer it may be opened, as by use of a key to remove the rip strip 19 illustrated in Fig. 2, whereupon the fowl may be turned out complete and in its natural form. Due to the nature of the gelatin solution, the fowl is suitably seasoned and may be sliced cold, the superfluous gelatin solution being suitable for soup stock or broth. Or the fowl, after removal, may be oven browned sufficiently to give it the desired heating and the surface appearance of a freshly cooked fowl, the gelatin solution being suitable for use in preparation of gravy. Or the carcass may be disjointed or separated in half and given a finishing cooking by a short frying. Whichever way utilized, the fowl and portions thereof maintain the form and taste of freshly dressed and prepared poultry. A package of the sort described is of particular advantage to the consumer because it permits poultry having all of the appearances and savors of a home-cooked fowl to be prepared and served with only a small fraction of the labor and time involved in the preparation and cooking of poultry obtained from the market. A further advantage resides in the fact that the poultry can be thus packed in season and made available for use at any time of year, without being subject to the disagreeable characteristics of cold-storage goods. Moreover, a saving is accomplished by virtue of the elimination of offal before packing and shipment, thus saving transportation and refrigeration costs and permitting recovery of merchantable by-products from such offal.

It is to be understood that in the foregoing specification and in the appended claims, we employ the terms "fowl" and "poultry" in a general sense to indicate geese, ducks, turkeys and guinea fowl, as well as chickens and that the term "carcass" is employed to indicate a portion of a fowl which includes jointed bone structure with the adhering flesh, such as half a chicken, as well as the entire dressed body. It is to be understood also that the term "sterilize" is used herein to mean treatment which will so inhibit or deter bacterial growth and activity as to prevent bacterial decomposition in the sealed package, rather than in its absolute sense of complete destruction of all micro-organic life.

We claim:

1. The method of making a merchantable poultry package which comprises providing a dressed fowl carcass, placing the carcass in a flexible-walled container, filling substantially all unoccupied space in the container with a heated edible gellifying solution, exhausting air from the interior of the container and thereby inducing displacement of flexible wall portions of the latter inwardly in contact with the carcass, whereby the latter is held against movement to any substantial extent within the container, hermetically sealing the container to hold the negative pressure therein, subjecting the container and contents to a sterilizing and cooking heat adequate to cook the fowl, and finally cooling the container and contents while maintaining external pressure upon its wall portions tending to force them inwardly, whereby to insure the containers being completely filled upon the setting of the gellifying solution.

2. A method of packaging poultry which comprises providing a fowl carcass suitably dressed for cooking, placing the carcass in a container of such size and contour as to hold it against any substantial extent of movement therein, approximately filling the remaining space in the container with a hot gellifying solution containing salt exhausting air from the container, hermetically sealing the container to confine the carcass and solution therein, subjecting the container and its contents to heat to an extent adequate to cook the fowl and sterilize the same, and finally cooling the container and its contents to set the solution as a supporting and preserving envelopment in contact with the carcass.

3. A merchantable package of poultry comprising a dressed fowl carcass hermetically sealed and cooked in a container, said container having wall portions engaging the fowl to hold it against movement in the container to any substantial extent, and a set edible gelatin solution filling the space in the container about the carcass, said gelatin solution including a proportion of salt amounting to about 3%.

4. A merchantable package of poultry comprising a dressed fowl carcass hermetically sealed and cooked in a container, said container having wall portions holding the carcass against any substantial extent of movement therein, and a set edible gelatin solution filling the space in the container in and about the carcass, said gelatin solution containing salt and the substances rendered from the carcass in the cooking and being composed in most part of materials not derived from the carcass.

5. A merchantable package of poultry comprising a whole fowl carcass hermetically sealed and cooked in a flexible-walled container, said container having wall portions pressed against the carcass by external atmospheric pressure and holding the carcass against substantial movement in the container, and a gelatin solution containing salt filling the space in the container within and about the carcass and held in contact with same by the container.

6. A merchantable package of poultry comprising a container shaped to conform generally to the contour of a dressed fowl carcass and having flexible wall portions and relatively rigid seam portions maintaining its general contour, a dressed fowl carcass hermetically sealed and cooked in the container and held by wall portions of the same against substantial movement in the container, and a filling, comprising a set gelatin solution containing salt, and held in supporting contact with the carcass by the container.

7. A merchantable package of poultry comprising a fowl carcass cooked for serving and hermetically sealed in a container together with an edible gellified solution containing salt in a proportion approximating 3%, said gellified solution being composed for the most part of materials not derived from the fowl and containing substances rendered from the fowl in the cooking thereof.

8. A method of packaging poultry which comprises providing a dressed, raw fowl carcass, placing the same in a container, closing the container to confine the carcass and incidentally subjecting it to compression but leaving a small opening into the container, introducing a hot gellifying solution into the container through said opening in quantity to approximately fill the space within and about the carcass, exhausting air from within the container, sealing the container air tight, processing the container and contents with heat, and cooling the container and contents to gellify the solution in and about the carcass.

9. A method of making a poultry package which comprises providing a fowl carcass suitably dressed for cooking, placing the dressed carcass in a container, closing the container excepting for a small opening, introducing into the container through said opening a quantity of heated edible gellifying solution sufficient to approximately fill all unoccupied space in the container, exhausting air from the interior of the container, hermetically sealing the container, subjecting the container and contents to heat to an extent adequate to cook the fowl and sterilizing the container's contents and cooling the container and contents adequately to set the gellifying solution in contact with the carcass.

10. A method of packing poultry which comprises hermetically healing a dressed, raw fowl carcass, together with a hot gelatin solution containing about 6% of salt, in a container and exhausting air from within the container, cooking the fowl in the sealed container in the presence of the salted gelatin solution, and cooling the container and contents to set the gelatin solution, the container remaining sealed throughout the procedure subsequent to its initial sealing.

In testimony whereof we have hereunto subscribed our names.

JAY C. HORMEL.
HORACE H. COREY.
EDWIN J. CASHMAN.

CERTIFICATE OF CORRECTION.

Patent No. 1,740,176.  Granted December 17, 1929, to

JAY C. HORMEL ET AL.

It is hereby certified that error appears in the printed specification of the above numbered patent requiring correction as follows: Page 2, line 37, for the word "solution" read "container", and lines 38 and 39, for "container" read "solution"; page 3, line 96, claim 2, before the word "fowl" insert the word "raw"; page 4, line 67, claim 10, for the word "healing" read "sealing"; and that the said Letters Patent should be read with these corrections therein that the same may conform to the record of the case in the Patent Office.

Signed and sealed this 4th day of February, A. D. 1930.

(Seal)

M. J. Moore,
Acting Commissioner of Patents.